Patented Feb. 7, 1933

1,896,491

UNITED STATES PATENT OFFICE

MARTIN LUTHER, OF MANNHEIM, AND CLAUS HEUCK, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS FOR EMULSIFYING DIOLEFINES AND FOR THE PRODUCTION OF PRODUCTS SIMILAR TO LATEX

No Drawing. Application filed December 27, 1928, Serial No. 328,841, and in Germany February 8, 1928.

This invention relates to a process for emulsifying diolefines and the production of products similar to latex, and is an improvement in the process described in our copending application Ser. No. 244,550 filed January 4, 1928 which has matured into Patent 1,864,078.

We have found that diolefines, such as butadiene, isoprene and the homologues of butadiene, can be advantageously emulsified in water by separately dissolving constituent substances, which when placed in mutual contact react to form emulsifying agents, in diolefines and water, employed separately or in association, the solutions thus obtained being then mixed. The resulting emulsion of diolefines can be subjected directly to polymerization, products similar to latex being obtained. For example, to prepare emulsions of the diolefines, a low percentage of that constituent substance of the emulsifying agent, which is soluble in the diolefine to be polymerized, such as fatty acids like oleic, linoleic and ricinoleic acids, or resinic acids or the like is dissolved in the said diolefine to be polymerized, this solution being then incorporated, by agitation, stirring or the like, with an aqueous solution of the other constituent substance of the emulsifying agent, thus in the case under consideration, inorganic or organic bases, preferably ammonia, buffer systems being, if desired, added to the solution of the bases. The emulsifying agent, ammonium oleate, for example, in the present instance, has a far greater emulsifying capacity, with this method of operating, than a ready-prepared emulsifying agent and the resulting emulsion is therefore far more suitable for the subsequent polymerization of the diolefines. This method of procedure also simplifies, in a very marked manner, the fine distribution of further substances which facilitate the polymerization of the diolefines or the further treatment of the polymerized products. Such substances comprise oxygen and oxidizing agents, such as hydrogen peroxide, benzoyl peroxide, with or without oxygen transferrers, for example, cobalt oleate or manganese cinnamate, also proteids, pectin bodies and similar natural or artificial resins, plasticizing and stabilizing agents, such as oils and the like, and finally substances which accelerate the subsequent vulcanization. In certain circumstances, these additions may be added to the diolefines or the water prior to the formation of the emulsion, provided the additions do not hinder the emulsification or polymerization.

As we have found, products resembling latex can be obtained by adding to emulsions, dispersions or solutions of diolefines in a liquid, preferably aqueous medium, besides compounds which supply oxygen, such as hydrogen peroxide, urea-hydrogen peroxide, or other peroxides, ozonides or the like, also agents which combine with acids, preferably buffer systems, and by conducting the polymerization at temperatures below 60° C., for example, at room temperature. In order to prevent premature coagulation, it is usually found advantageous to add the oxygen-supplying and acid-fixing agents by degrees in the course of polymerization, instead of all at once at the outset.

This method of operating enables an artificial rubber latex to be produced in the minimum time, at ordinary, or only moderately elevated temperature, and enables polymerization products of diolefines to be produced in a continuous and simple manner, since a liquid reaction product, which can be easily manipulated, is first obtained which can be transformed into rubber-like products of excellent properties, by coagulation in any known manner, for example, with acetic acid.

The following examples will further illustrate the nature of the invention which, however, is not limited to these examples. The parts are by weight unless otherwise stated.

Example 1

5 parts of benzoyl peroxide, 0.5 part of cobalt oleate, 12.6 parts of olein, 4 parts of piperidine piperidyldithiocarbamate and 10 parts of linseed oil, are dissolved in 400 parts of β-methylbutadiene, and an emulsion is then prepared by agitation with a solution of 10 parts of trisodium phosphate in 500 parts of 0.5 per cent ammonia, which also contains 25 parts of a 5 per cent solution of glue and 5 parts of a 10 per cent solution of hydrogen peroxide.

On moderate heating, or also by allowing the solution to stand at room temperature, a liquid similar to latex is obtained, which furnishes, on coagulation in any known manner, a product resembling rubber.

*Example 2*

A mixture of 400 parts by volume of β-methylbutadiene, 15 parts of ammonium oleate, 10 parts of trisodium phosphate, 5 parts by volume of a 30 per cent solution of hydrogen peroxide, 25 parts by volume of a 5 per cent solution of glue, and 500 parts by volume of water, are first emulsified in an agitation at ordinary temperature. After standing for about 190 hours at room temperature, a viscous, perfectly homogeneous liquid, similar to latex, will have formed, which, on coagulation with acetic acid, furnishes a precipitate of a mass resembling rubber.

*Example 3*

400 parts by volume of butadiene, 15 parts of ammonium linoleate, 5 parts of ammonium oleate, 10 parts of sodium carbonate, 2 parts of disodium phosphate, 10 parts by volume of a 30 per cent solution of hydrogen peroxide, 75 parts of a 5 per cent solution of glue and 450 parts by volume of water, are emulsified in a pressure vessel and are then warmed at 30° to 40° C. for 12 hours. A liquid resembling latex is obtained which furnishes, on coagulation, a polymerized product with the properties of rubber.

*Example 4*

400 parts of butadiene are emulsified in water as in Example 2, but without the addition of hydrogen peroxide at first. After emulsification, the mixture is forced through a long system of pipes mounted in a thermostat which is maintained at a temperature of about 30° to 40° C., a 10 per cent solution of hydrogen peroxide being introduced in stages. The amount of hydrogen peroxide solution added is equivalent to a total admission of about 30 parts by volume of a 10 per cent solution by the time the entire emulsion of the 400 parts by weight of butadiene has passed through the pipes. The butadiene recovered on the pressure being afterwards relieved, can be liquefied by suitable compression, and used again for preparing the emulsion. A liquid similar to latex is obtained, which, when coagulated in any known manner furnishes products resembling rubber.

What we claim is:

1. A process for the production of substances of the nature of latex, which comprises emulsifying diolefines in water by separately dissolving constituent substances, which when placed in mutual contact react to form emulsifying agents, in diolefines and water and mixing the solutions thus obtained and polymerizing in the presence of an oxidizing agent and a buffer system.

2. A process for the production of substances of the nature of latex, which comprises emulsifying diolefines in water by separately dissolving constituent substances, which when placed in mutual contact react to form a substance of soap character, in diolefines and water and mixing the solutions thus obtained and polymerizing in the presence of hydrogen peroxide and a buffer system.

3. A process for the production of substances of the nature of latex, which comprises emulsifying a diolefine in an aqueous medium, adding compounds which supply oxygen and an inorganic acid-fixing agent and polymerizing at temperatuers below 60° C.

4. A process for the production of substances of the nature of latex, which comprises emulsifying a diolefine in water, adding compounds which supply oxygen and an inorganic acid-fixing agent and polymerizing at temperatures below 60° C.

5. A process for the production of substances of the nature of latex, which comprises emulsifying a diolefine in water, adding an oxygen-supplying and an inorganic acid-fixing agent by degrees in the course of the polymerization, the polymerization being carried out at temperatures below 60° C.

6. A process for the production of substances of the nature of latex, which comprises emulsifying a diolefine in water, adding an oxygen-supplying and an inorganic acid-fixing agent by degrees in the course of the polymerization, the polymerization being carried out at temperatures below 60° C. and in a continuous manner.

7. A process for the production of substances of the nature of latex, which comprises dissolving benzoyl peroxide, cobalt oleate, oleic acid, piperidine piperidyldithiocarbamate and linseed oil in a butadiene and agitating the solution with aqueous very dilute ammonia containing trisodium phosphate, glue and hydrogen peroxide, and polymerizing at room temperature.

In testimony whereof we have hereunto set our hands.

MARTIN LUTHER.
CLAUS HEUCK.